US011079993B2

(12) United States Patent
Kubota

(10) Patent No.: US 11,079,993 B2
(45) Date of Patent: Aug. 3, 2021

(54) IMAGE FORMATION APPARATUS AND CONTROL METHOD FOR PRINT EXECUTION PROCESSING WHERE PRINT DATA IS TRANSMITTED TO A FOLDER

(71) Applicant: CANON KABUSHIKI KAISHA, Tokyo (JP)

(72) Inventor: Tomohide Kubota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/774,603

(22) Filed: Jan. 28, 2020

(65) Prior Publication Data

US 2020/0272394 A1 Aug. 27, 2020

(30) Foreign Application Priority Data

Feb. 26, 2019 (JP) ............................ JP2019-033295

(51) Int. Cl.
*G06F 3/12* (2006.01)

(52) U.S. Cl.
CPC .......... *G06F 3/1285* (2013.01); *G06F 3/1204* (2013.01); *G06F 3/1205* (2013.01); *G06F 3/127* (2013.01); *G06F 3/1296* (2013.01)

(58) Field of Classification Search
None
See application file for complete search history.

(56) References Cited

U.S. PATENT DOCUMENTS

2004/0057073 A1 3/2004 Egawa
2009/0273799 A1* 11/2009 Hanawa ................ G06F 3/1204 358/1.9
2012/0133976 A1 5/2012 Tadokoro
2012/0133981 A1 5/2012 Kise

FOREIGN PATENT DOCUMENTS

JP 2016-167158 A 9/2016

* cited by examiner

*Primary Examiner* — Lennin R Rodriguezgonzalez
(74) *Attorney, Agent, or Firm* — Canon U.S.A., Inc. IP Division

(57) ABSTRACT

A print setting corresponding to a folder referable by an external apparatus is stored in an image formation apparatus, storage of a file in the folder is detected, the detected file is moved to a storage area in the image formation apparatus, and a print job is generated based on the moved file and information about the print setting corresponding to the detected folder.

9 Claims, 9 Drawing Sheets

FIG.5

| | | 501 | 502 |
|---|---|---|---|
| | | hotfolderA | hotfolderB |
| 503 | NUMBER OF SHEETS TO BE COPIED | 1 copy | 5 copies |
| 504 | PAGE AGGREGATION | 1 in 1 | 4 in 1 |
| 505 | COLOR SELECTION | AUTO | AUTO |
| 506 | DOUBLE-SIDED PRINTING | DOUBLE-SIDED | NO |
| 507 | STAPLER | UPPER LEFT | NO |

FIG.7

| | No. | ERROR INFORMATION (701) | FILE NAME (702) | HOT FOLDER NAME (703) |
|---|---|---|---|---|
| 704 | 1 | NOT INCLUDED | fileA.pdf | hotfolderB |
| 705 | 2 | INCLUDED | fileB.txt | — |
| 706 | 3 | NOT INCLUDED | fileC.pdf | hotfolderA |
| | ... | ... | ... | ... |

IMAGE FORMATION APPARATUS AND CONTROL METHOD FOR PRINT EXECUTION PROCESSING WHERE PRINT DATA IS TRANSMITTED TO A FOLDER

BACKGROUND OF THE INVENTION

Field of the Invention

The present invention relates to print execution processing in an image formation apparatus in a case where print data is transmitted to a folder, which is referable by an external apparatus, in the image formation apparatus.

Description of the Related Art

Japanese Patent Application Laid-Open No. 2016-167158 discusses a mechanism where an image formation apparatus has a function of a hot folder application. In this mechanism, the image formation apparatus has a hot folder and also a print condition corresponding to the hot folder. When a file is stored in the hot folder, print execution processing is executed based on the stored print condition.

The hot folder in the image formation apparatus can be accessed using a general-purpose file sharing protocol. Thus, the file might be accessed by another user until execution of printing after the file has been stored in the hot folder. In Japanese Patent Application Laid-Open No. 2016-167158, after the storage of the file in the hot folder is detected, a print job is generated and the file is moved to another folder. For this reason, in a particular case where a plurality of files is stored in the hot folder, the generation of print jobs takes a longer time. Accordingly, for example, another user can access (write or delete) the files for a longer time.

SUMMARY OF THE INVENTION

The present invention is directed to reducing access to a file stored in a hot folder in an image formation apparatus further than a conventional technique.

According to an aspect of the present invention, an image formation apparatus communicable with an external apparatus includes a storage unit configured to store a print setting corresponding to a folder referable by an external apparatus into the image formation apparatus, a detection unit configured to detect that a file is stored in the folder, a movement unit configured to move the file detected by the detection unit to a storage area in the image formation apparatus, a first generation unit configured to generate a print job based on the moved file and information about the print setting stored by the storage unit, the print setting being corresponding to the folder detected by the detection unit, and a processing unit configured to execute print processing based on the generated print job.

Further features of the present invention will become apparent from the following description of exemplary embodiments with reference to the attached drawings.

BRIEF DESCRIPTION OF THE DRAWINGS

FIG. 5 illustrates an example of print settings set in a hot folder.

FIG. 7 illustrates an example of print job lists.

DESCRIPTION OF THE EMBODIMENTS

Exemplary embodiments of the present invention are described below with reference to the drawings.

Figure 1:
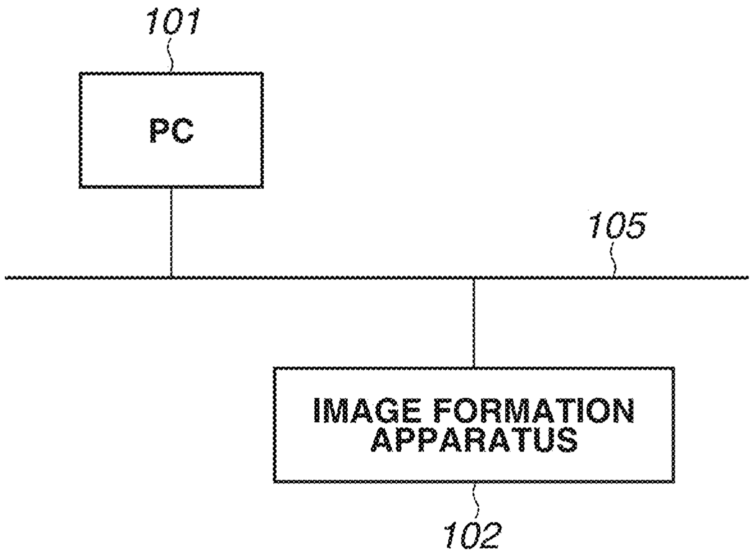
FIG. 1 is a diagram illustrating an example of a network configuration.

FIG. 1 is a diagram illustrating an example of a network configuration according to a first exemplary embodiment. A local area network (LAN) 105 is connected to a personal computer (PC) 101 and an image formation apparatus 102 that are communicable with each other. The PC 101 inputs a print job, and the image formation apparatus 102 processes the input print job. The number of PCs and image formation apparatuses to be connected to the LAN 105 is not limited to the number shown in this configuration. The image formation apparatus 102 and the PC 101 each have a file sharing function that enables mutual file transmission, reception, and sharing between apparatuses connected to the LAN 105. The file sharing function is achieved by using a general-purpose protocol such as a Server Message Block (SMB) protocol or a Web Distributed Authoring and Versioning (WebDav) protocol. In the present exemplary embodiment, an input source of the print job is the PC 101, but can be a device other than the PC (for example, a mobile terminal, or another image formation apparatus).

Figure 2:
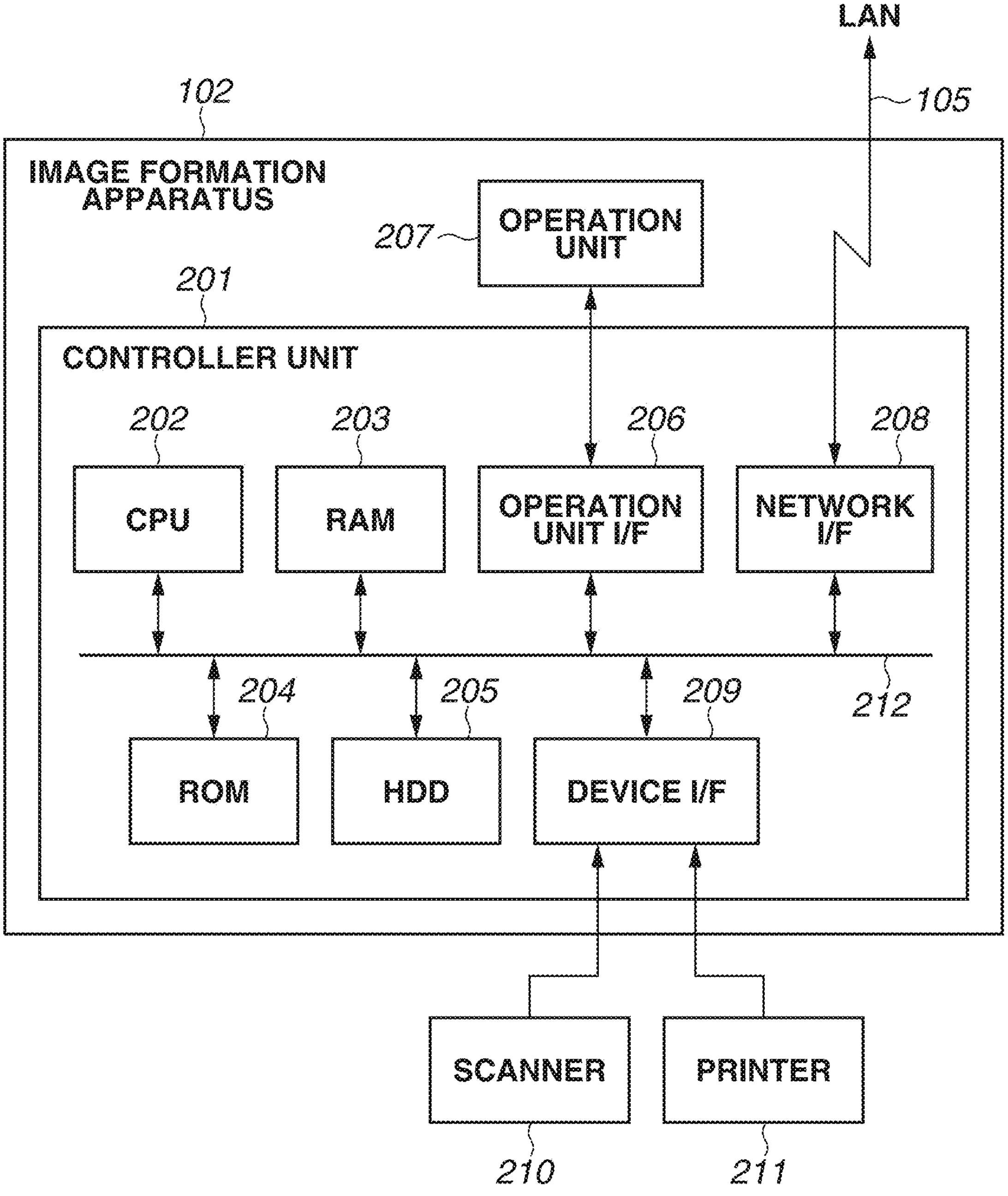
FIG. 2 is a block diagram illustrating an entire configuration of an image formation apparatus.

FIG. 2 is a block diagram illustrating an entire configuration of the image formation apparatus 102. In a controller unit 201 of the image formation apparatus 102, a central processing unit (CPU) 202 is a computing unit that controls an entire system. A random access memory (RAM) 203 is a system work memory for an operation of the CPU 202, and is an image memory for temporarily storing image data. Further, programs and data for an operating system, system software, and application software are also arranged in the RAM 203. A read only memory (ROM) 204 stores a boot program of the system.

A hard disk drive (HDD) 205 stores an operating system, system software, application software, image data, setting data, etc. An operation unit interface (I/F) 206, which is an interface unit with an operation unit 207, outputs information to be displayed on the operation unit 207 to the operation unit 207. Further, the operation unit I/F 206 receives information input by a user through the operation unit 207.

A network I/F 208, which is connected to the LAN 105, receives and outputs information from and to the PC and another image formation apparatus connected to the identical LAN. A device I/F 209 connects a scanner 210 and a printer 211 as image input and output devices to the controller unit 201, thus inputting and outputting image data. Such components are arranged on a system bus 212.

Figure 3:
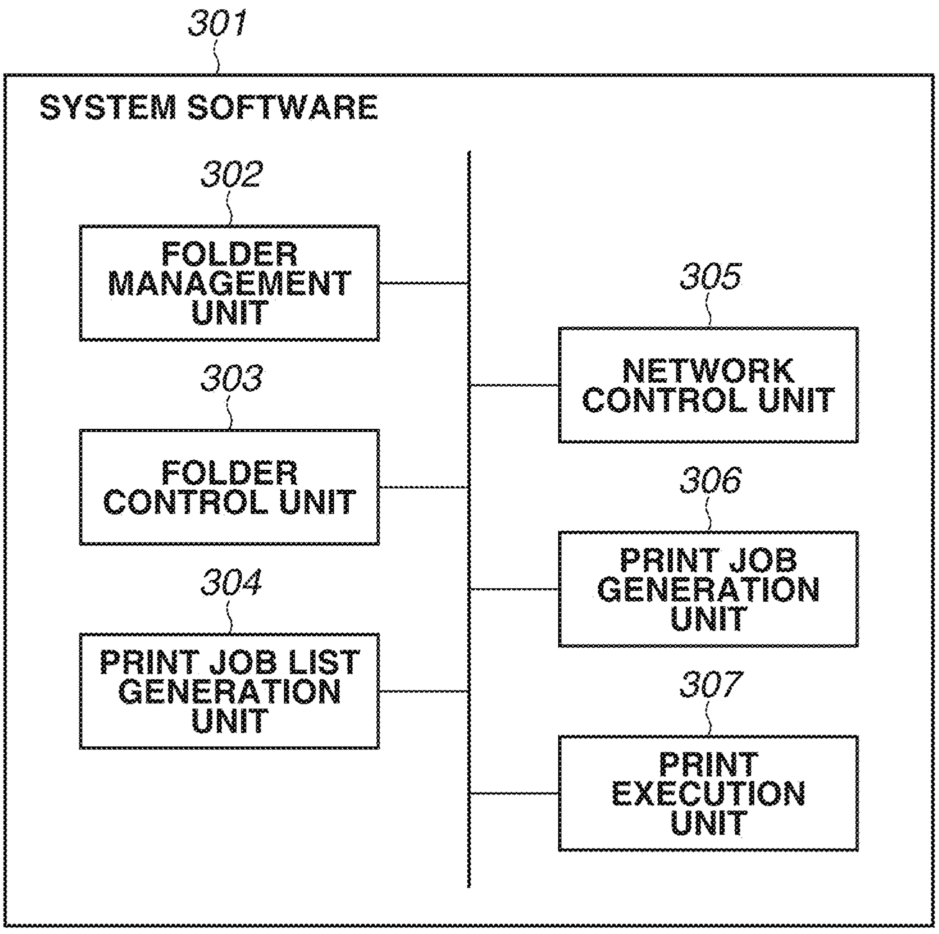
FIG. 3 is a block diagram illustrating a functional configuration of system software of the image formation apparatus.

FIG. 3 is a block diagram illustrating a functional configuration of the system software of the image formation apparatus 102 in the present exemplary embodiment.

System software 301 is stored in storage units such as the RAM 203, the ROM 204, and the HDD 205, and is executed by the CPU 202.

A folder management unit 302 manages folders stored in the HDD 205. The folders include a hot folder where a file can be transmitted to, and received from, an external apparatus such as the PC 101 via the LAN 105. The hot folder has a function for detecting reception of the file to execute print execution processing. The folder management unit 302 manages such hot folder. Further, the folder management unit 302 manages also print setting information to be reflected in print data at execution of printing for the hot folder.

A folder control unit 303 detects reception of a file in a hot folder, and moves a file received before the print execution processing to a print folder (for example, a print folder that is not referable by the external apparatus).

A print job list generation unit 304 receives information about the hot folder that has received a file (hereinafter referred to as hot folder information) and information about the received file (hereinafter referred to as file information) from the folder control unit 303 to generate a print job list.

A network control unit 305 receives a request from the PC 101 or another image formation apparatus connected to the LAN 105, via the network I/F 208. In a case where the received request is to store the file in a folder managed by the folder management unit 302, the network control unit 305 stores the file in the folder.

Upon the generation of the print job list by the print job list generation unit 304, a print job generation unit 306 acquires print setting information managed by the folder management unit 302 from the hot folder information in the print job list. The print job generation unit 306 generates a print job based on the acquired print setting information and the file information in the print job list to transmit the print job to a print execution unit 307.

The print execution unit 307 receives the print job from the print job generation unit 306, transmits the print job to the printer 211 via the device I/F 209, and controls the printer 211. Thus, the printer 211 executes print processing.

Figure 4:
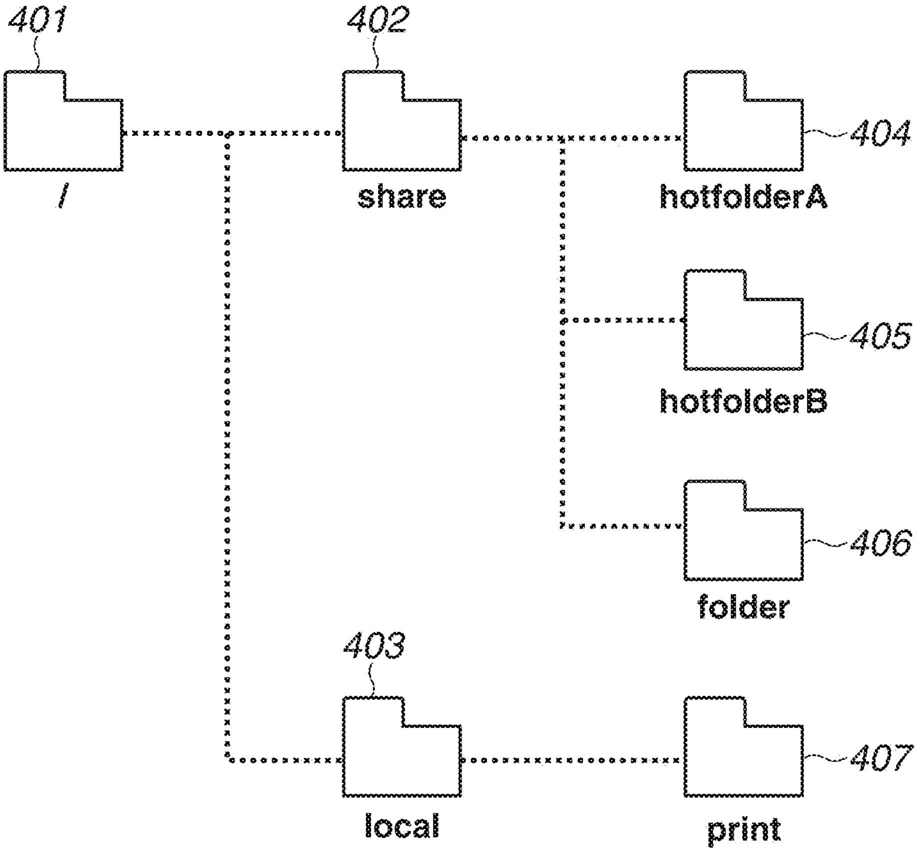
FIG. 4 illustrates an example of folder information held by the image formation apparatus.

FIG. 4 is a diagram illustrating an example of the folder information managed by the folder management unit 302.

A folder 401 is a root folder of the image formation apparatus 102. In the example of FIG. 4, a folder 402 named "share" and a folder 403 named "local" are located below the folder 401. In the present exemplary embodiment, the folder 402 and folders below the folder 402 are public folders having files sharable by an external apparatus. The folder 403 and folders below the folder 403 are private folders hidden from an external apparatus, namely, processing folders in the image formation apparatus 102. Further, a folder 404 named "hotfolderA", a folder 405 named "hotfolderB", and a folder 406 named "folder" are arranged below the folder 402. A folder 407 named "print" is arranged below the folder 403, and is used as an internal work folder during the printing for a hot folder.

The folder 404 and the folder 405 are managed by the folder management unit 302 to have a hot folder function. Specifically, the folder management unit 302 detects reception (copying) of files in the folders, and prints the detected files based on predetermined print settings. The print settings are, for example, as illustrated in FIG. 5. The print settings described in a hotfolderA 501 are set for the folder 404, and the print settings described in a hotfolderB 502 are set for the folder 405. The folders having the hot folder function can be generated by and the print settings corresponding to the folders can be set by operations using the operation unit 207. Alternatively, such generation and print settings can be performed by a method of accessing the image formation apparatus 102 from the PC 101 via the LAN 105 to issue a generation instruction.

A print job list generation processing flow in the image formation apparatus 102 according to the first exemplary embodiment is described with reference to FIG. 6. The CPU 202 of the image formation apparatus 102 executes the system software 301 to execute the print job list generation processing flow in FIG. 6.

In step S601, the folder control unit 303 waits for copying (reception) of a file into a hot folder. In a case where the folder control unit 303 detects the copying of the file into the hot folder (Yes in step S601), in step S602, the folder control unit 303 acquires information about the hot folder in which the copying of the file has been detected (information for making the hotfolderA or the hotfolderB in FIG. 5 identifiable). In a case where the folder control unit 303 does not detect the copying of the file into the hot folder (No in step S601), in step S608, the folder management unit 302 determines whether this processing flow is terminated. This processing flow is to be executed when a hot folder is generated. If the hot folder is deleted and no hot folder is present, the processing flow is terminated. Alternatively, the folder management unit 302 can determine that the processing flow is terminated in a case where the copying of a file in a hot folder is not detected for a certain length of time.

In step S603, the folder control unit 303 moves the file, the copying of which has been detected in step S601, from the hot folder to a private folder (in the example of FIG. 4, the print folder 407: storage area).

In step S604, the print job list generation unit 304 checks whether printing is possible for the hot folder. Specifically, the print job list generation unit 304 checks whether the printing for the hot folder is permitted or whether the file moved to the private folder has a format (i.e., page description language (PDL)) of a print target. The determination as to whether the file has the format of the print target can be made based on an extension (if Portable Document Format (PDF) data is supported, the extension is ".pdf"). Alternatively, the determination can be made based on a byte file identifier at the top of the file (if PDF data is supported, the top of the file indicates "% PDF"). In a case where the printing is determined to be possible (Yes in step S604), the processing proceeds to step S605. In a case where the printing is determined to be impossible (No in step S604), the processing proceeds to step S606.

In step S605, the print job list generation unit 304 generates or updates the print job list based on the hot folder information acquired in step S602 and the information about the file moved to the private folder. The print job list is as illustrated in FIG. 7, for example. In a case where a file named "fileA.pdf" as PDF data is copied in a hotfolderB 405, a list 704 is saved. Error information 701 indicates "not included", a file name 702 indicates "fileA.pdf", and a hot folder name 703 indicates "hotfolderB". The information in the print job list illustrated in FIG. 7 is shared between this processing flow and a print job generation processing flow, described below, (in FIG. 8). The information in the print job list can be shared between the two processing flows using a shared memory. Alternatively, the information can be passed between the flows using a queue system. When the generation of the print job list is completed, the processing returns to step S601. In other words, in a case where a plurality of files is continuously copied, the processing flow is executed on the file in order of detecting the copying of the files. Just after the generation or updating of the print job list is completed, the processing flow is immediately executed on the next file, the copying of which is detected.

In step S606, the print job list generation unit 304 generates or updates the print job list based on the information determined as an error in step S604 and the information about the file moved to the private folder. The print job list is as illustrated in FIG. 7, for example. In a case where a file named "fileB.txt" that is not a print target is copied in a hot folder, a list 705 is saved. The error information 701 indicates "included", the file name 702 indicates "fileB.txt", and the hot folder name 703 indicates "—(no information)". The error information 701 includes information about "included" or "not included", but can include information that can minutely identify error information. Such error information includes an error of a file format or an error indicating that printing capability is not provided. In the hot folder name 703, the information acquired in step S602 is input and can be left as additional information for a case where a history, described below, is left.

In step S607, the print job list generation unit 304 deletes the file moved to the private folder when the generation of the print job list is completed, and the processing again returns to step S601.

In the above-described print job list generation processing flow, after the copying of the file in the hot folder is detected, the file is immediately moved to the private folder. Further, after the print job list is generated, the processing is immediately executed on a next file. Thus, even in a case where a plurality of files is continuously copied, a length of time during which the file in the hot folder is referable can be shortened as much as possible. Moreover, the print job generation processing flow, described blow, can be executed based on the information in the print job list illustrated in FIG. 7. Thus, a storage quantity of information is less than a storage quantity of information in the processing including generation of a print job.

Figure 8:
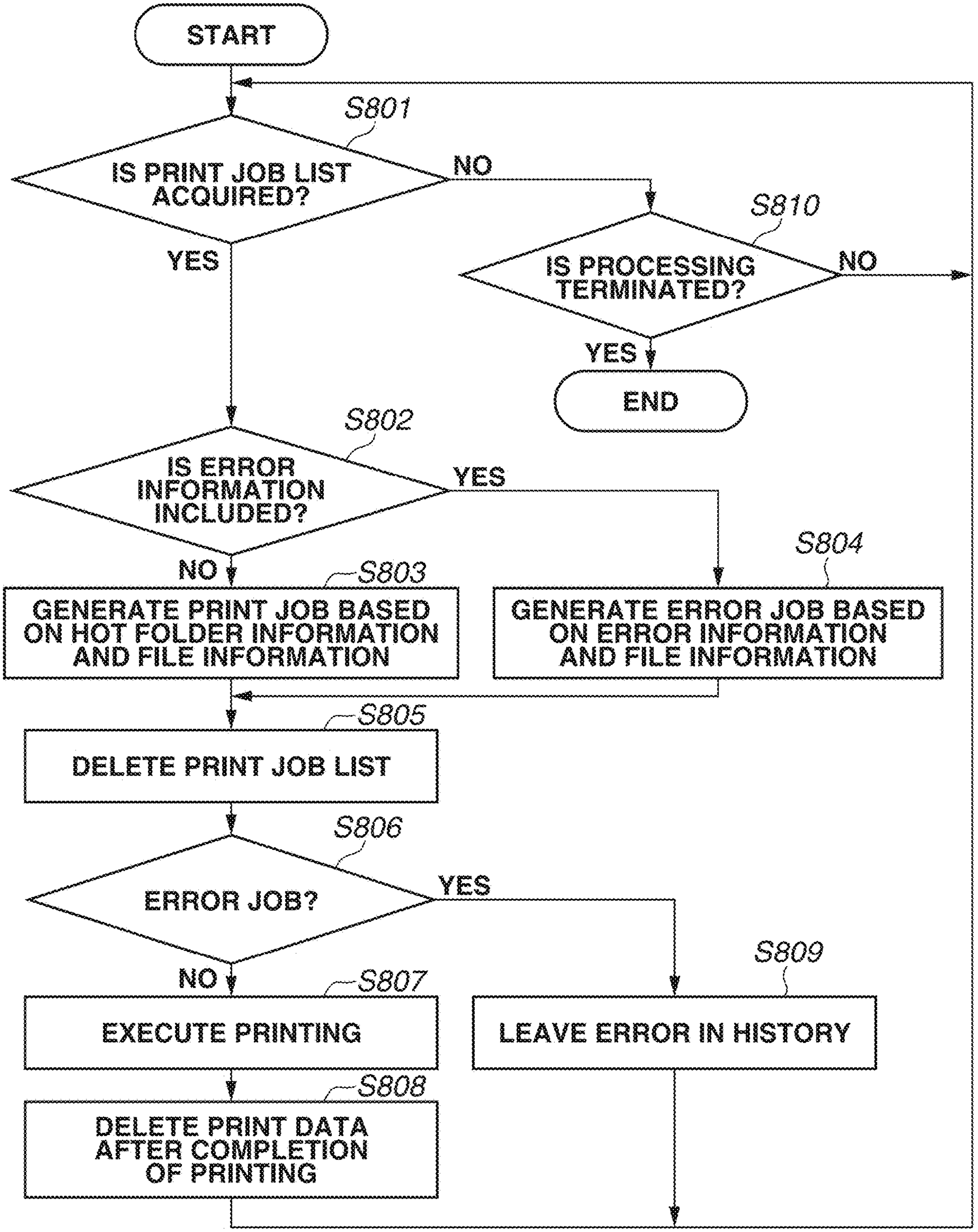
FIG. 8 is a flowchart describing the print job generation processing according to the present exemplary embodiment.

The print job generation processing flow in the image formation apparatus 102 according to the present exemplary embodiment is described below with reference to FIG. 8. The print job generation processing flow in FIG. 8 is executed by the CPU 202 of the image formation apparatus 102 executing the system software 301.

In step S801, the print job generation unit 306 waits for generation of a print job list or acquires print job information at the top of the print job list in a case where the print job list has been already generated. In the example of FIG. 7, in a case where the list 704, the list 705, and a list 706 are generated in this order, the print job generation unit 306 acquires print job information about the list 704 generated first. In a case where the print job generation unit 306 can acquire a print job list (Yes in step S801), the processing proceeds to step S802. If not (No in step S801), in step S810, the print job generation unit 306 determines whether the processing flow is terminated. A termination determining method is similar to that in step S608.

In step S802, the print job generation unit 306 determines whether the print job information acquired in step S801 includes error information. In a case where the print job information includes error information (Yes in step S802), the processing proceeds to step S804, but if not (No in step S802), the processing proceeds to step S803.

In step S803, the print job generation unit 306 generates a print job based on hot folder information and file information in the print job information acquired in step S801. Specifically, the print job generation unit 306 acquires a hot folder name introduced from the hot folder information, and acquires related print settings from print setting information (in FIG. 5) held in the folder management unit 302. In a case of the print job in the list 704, the print job generation unit 306 can acquire print setting information described in the hotfolderB 502. The print job generation unit 306 provides the acquired print setting information to the file and generates a print job. After the generation of the print job, in step S805, the print job generation unit 306 deletes the print job list. In the example of FIG. 7, in a case where the print job in the list 704 is generated, the list 704 is deleted and the list 705 and the list 706 remain.

In step S804, the print job generation unit 306 generates an error job based on error information and file information in the print job information acquired in step S801. Specifically, the print job generation unit 306 generates an error job that includes the acquired error information and file name information but does not include entity of print data. This error job is generated only for a case where an error is left in history information. The example of the list 705 includes only the error information, namely, information representing that an error occurs due to any factor. In a case where error information about the file format described for step S606 is present, the list 705 includes information indicating a file format error. In step S805, the print job generation unit 306 deletes the print job list after the error job has been generated. In the example of FIG. 7, in a case where the error job in the list 705 is generated, the list 705 is deleted and the list 706 remains (the list 704 has been already deleted in step S803).

In step S806, the print execution unit 307 acquires the job generated in step S803 or step S804 and determines whether the job is a print job or an error job. In a case where the acquired job is a print job (No in step S806), the processing proceeds to step S807. In a case where the acquired job is an error job (Yes in step S806), the processing proceeds to step S809.

In step S807, the print execution unit 307 prints the generated print job, and deletes related print data in step S808 after the execution of the printing. This processing is executed on the file moved to the private folder in step S603. The processing again returns to step S801, and continues if information about a print job list is still present.

In step S809, the print execution unit 307 displays the error information and the related file name information, which have been acquired from the generated error job information, on the print history displayable on the operation unit 207. The processing again returns to step S801, and continues if information in the print job list is still present.

Figure 6:
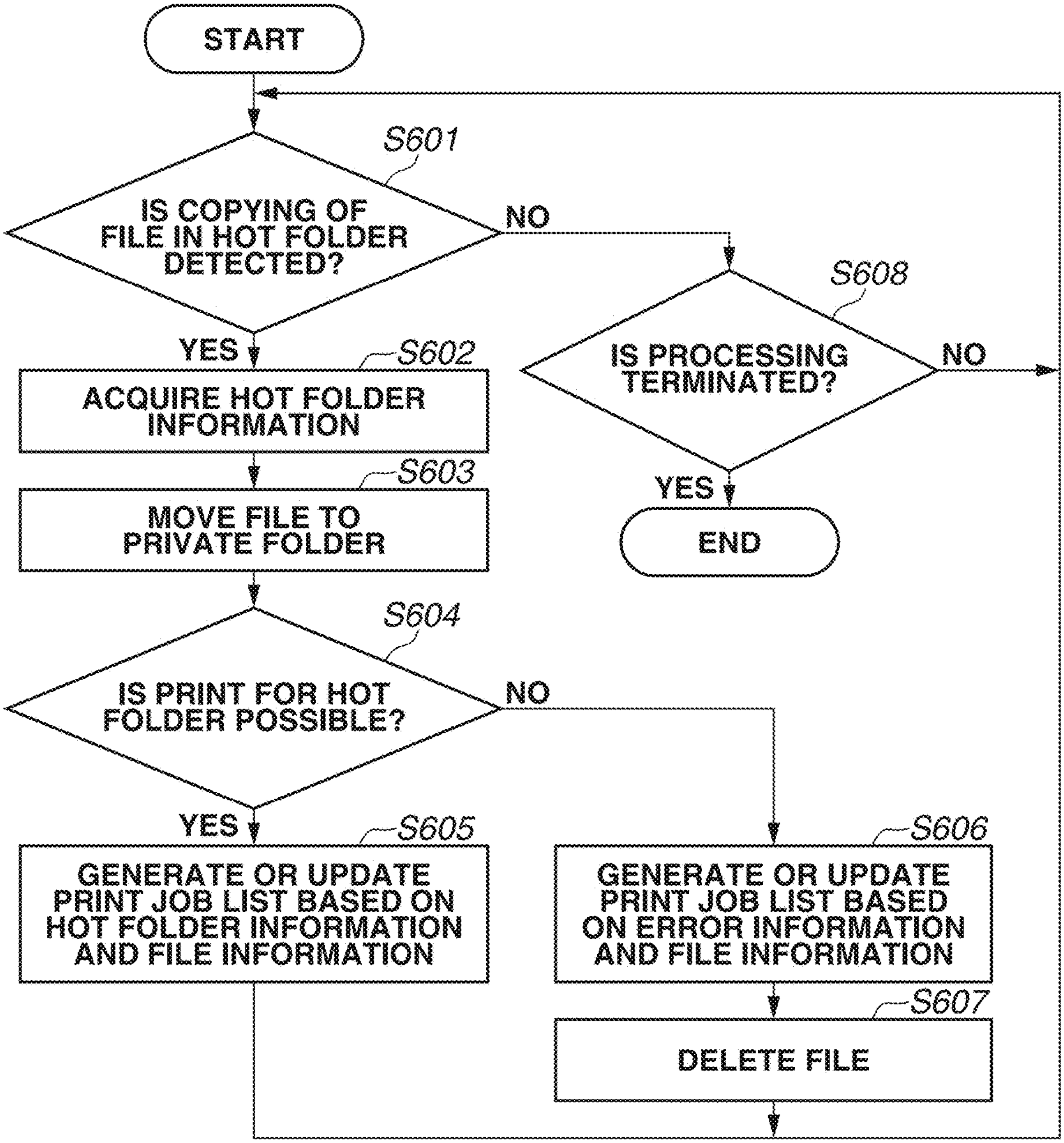
FIG. 6 is a flowchart describing print job list generation processing according to a first exemplary embodiment.

As shown in FIG. 6 and FIG. 8 according to the present exemplary embodiment, the print job list generation processing flow and the print job generation processing flow share the information in the print job list, and thus can be executed in parallel. For this reason, if the print job list generation processing flow is preferentially executed, the length of time during which a file exists in the hot folder can be shortened.

As described above, according to the present exemplary embodiment, after storage of a file in the hot folder in the image formation apparatus 102 is detected, the file is moved to an externally inaccessible folder in the image formation apparatus 102 before generation of a print job which takes time. For this reason, in the present exemplary embodiment, external access to a file can be further reduced in comparison with conventional techniques.

Further, after the file has been moved to the externally inaccessible folder, the print job list is generated before the generation of a print job which takes time. Thus, an upper limit number or more of files can be stored in the hot folder regardless of an upper limit number of print job queues in the image formation apparatus 102. A specific effect is described as follows. In a case where a file is moved to another folder after the generation of a print job, upon storage of a large number of files in the hot folder, print jobs of the stored files are generated. As a result, the number of the print jobs reaches the upper limit number of the print job queues in the image formation apparatus 102. Thus, a print job cannot be generated until the generated print jobs are executed, and further a file cannot be moved to another folder. On the contrary, in the present exemplary embodiment, after a file has been moved to an externally inaccessible folder, a print job list is generated. For this reason, the generation of a print job that takes time can be delayed. Further, a larger number of files can be stored in the hot folder regardless of the upper limit number of print job queues in the image formation apparatus 102.

In a second exemplary embodiment, another exemplary embodiment of the print job list generation processing described with reference to FIG. 6 in the first exemplary embodiment is described. Hereinafter, description about the configuration identical to in the first exemplary embodiment is omitted, and parts different from the description in the first exemplary embodiment are described.

Figure 9:
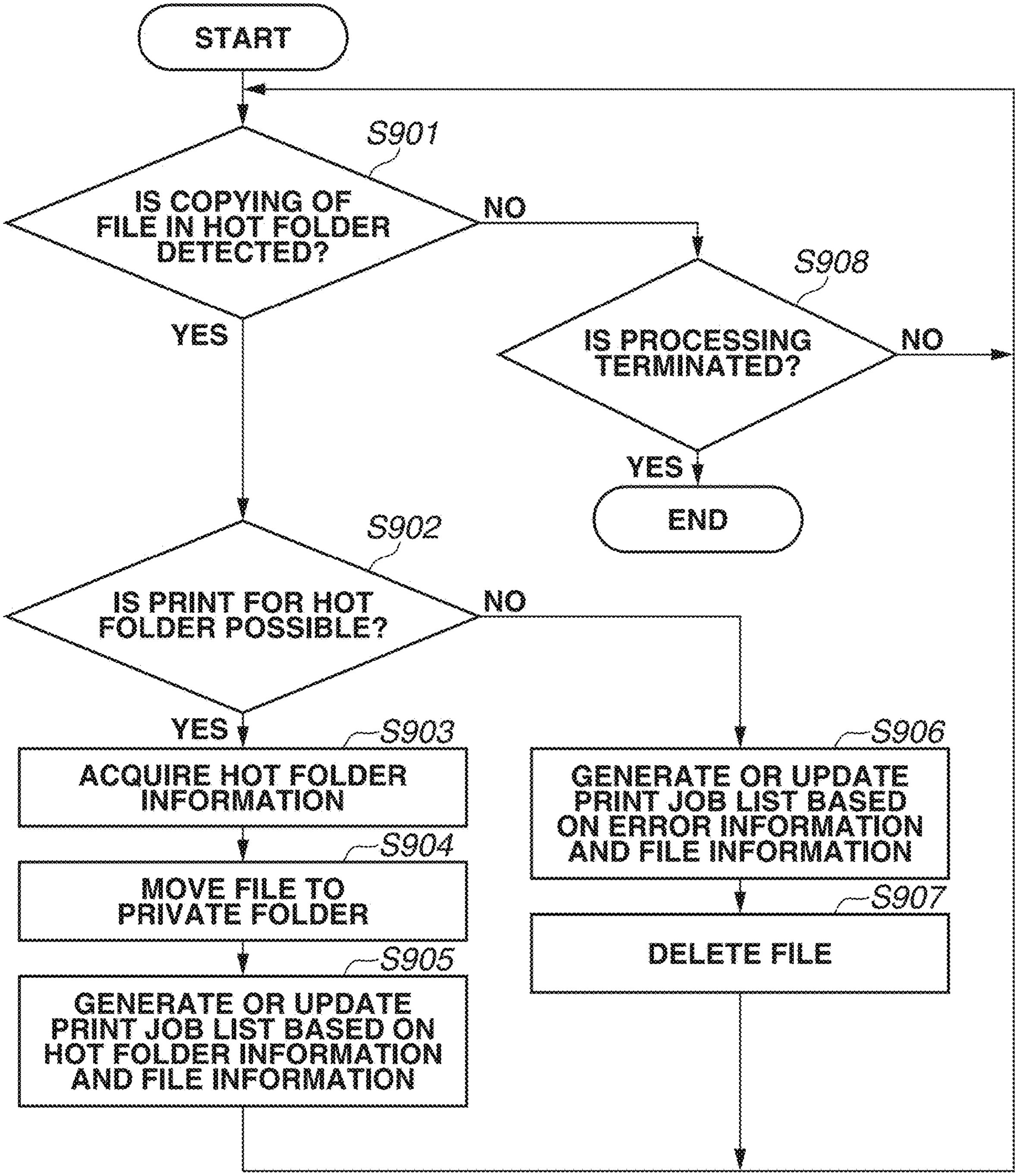
FIG. 9 is a flowchart describing print job list generation processing according to a second exemplary embodiment.

The print job list generation processing flow in the image formation apparatus 102 according to the second exemplary embodiment is described with reference to FIG. 9. In FIG. 9, the print job list generation processing flow is executed by the CPU 202 of the image formation apparatus 102 executing the system software 301.

The processing in steps S901 and S908 is similar to the processing in steps S601 and S608 respectively, and thus description thereof is omitted.

In step S902, the folder control unit 303 checks whether printing can be performed for a hot folder. Specifically, the folder control unit 303 checks whether the printing for the hot folder is permitted or whether a file, the copying of which has been detected in step S901, has a format (i.e., PDL) of a print target. The determination of whether the file has the format of the print target is similar to the determination in step S604. In a case where the determination is made that the printing is possible (Yes in step S902), the processing proceeds to step S903, but if not (No in step S902), the processing proceeds to step S906.

The processing in steps S903 and S904 is similar to the processing in steps S602 and S603 respectively, but the processing in step S902 is executed before step S903 unlike the first exemplary embodiment.

The processing in step S905 is similar to the processing in step S605, and thus description thereof is omitted.

In step S906, the print job list generation unit 304 generates or updates a print job list based on the information determined as an error in step S902 and information about the file, the copying of which has been detected in step S901. Contents to be generated in the print job list are similar to those in step S606, and thus description thereof is omitted.

In step S907, the print job list generation unit 304 deletes the file, the copying of which has been detected in step S901, when the generation of the print job list is completed. The processing then returns to step S901.

As described above, in the second exemplary embodiment, after the copying of the file into the hot folder is detected, a check is made as to whether the printing for the hot folder is possible, and the file is moved to another folder. As a result, a file which has been determined to be unprintable is not moved to a private folder. Thus, only a print job list is generated and the file is deleted. For this reason, unnecessary file movement processing is omitted, and thus processing efficiency is improved. A length of time for checking the possibility of the printing is shorter than a length of time for generating a print job. Also in the second exemplary embodiment, the access to a file stored in a hot folder can be further reduced in comparison with the conventional techniques.

According to the above-described exemplary embodiments, the access to a file stored in the hot folder in the image formation apparatus can be further reduced in comparison with the conventional techniques.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-033295, filed Feb. 26, 2019, which is hereby incorporated by reference herein in its entirety.

What is claimed is:

1. An image formation apparatus communicable with an external apparatus, comprising:

a storage unit configured to store a print setting corresponding to a folder referable by an external apparatus;

a detection unit configured to detect that a file is stored in the folder;

a movement unit configured to move the file detected by the detection unit to a storage area in the image formation apparatus;

a first generation unit configured to generate a print job based on the moved file and the print setting stored by the storage unit, the print setting being corresponding to the folder detected by the detection unit; and a processing unit configured to execute print processing based on the generated print job, wherein the storage area, to which the file is moved by the movement unit, in the image formation apparatus is an area inaccessible by an external apparatus.

2. The image formation apparatus according to claim 1, further comprising a second generation unit configured to generate a print job list based on information about the moved file and information about the folder detected by the detection unit, wherein the first generation unit acquires the information about the print setting stored by the storage unit from the information about the folder included in the print job list generated by the second generation unit, and generates a print job based on the acquired information about the print setting and the moved file.

3. The image formation apparatus according to claim 1, further comprising a determination unit configured to determine whether the file detected by the detection unit is printable, wherein, in a case where the determination unit determines the file as unprintable, a second generation unit generates a print job list including error information representing an unprintable state and the first generation unit generates an error job based on the error information included in the generated print job list.

4. The image formation apparatus according to claim 3, wherein, in a case where the processing unit executes print processing, the error job generated by the first generation unit is not subject to printing and error information remains in history information of the print job.

5. A control method for an image formation apparatus communicable with an external apparatus, the control method comprising:

storing a print setting corresponding to a folder referable by an external apparatus;

detecting that a file is stored in the folder;

moving the file detected in the detecting to a storage area in the image formation apparatus;

firstly generating a print job based on the moved file and the print setting stored in the storing, the print setting being corresponding to the folder detected in the detecting; and executing print processing based on the generated print job, wherein the storing, to which the file is moved, in the image formation apparatus is an area inaccessible by an external apparatus.

6. The control method for the image formation apparatus according to claim 5, further comprising secondly generating a print job list based on information about the moved file and information about the folder detected in the detecting, wherein the first generating acquires the information about the print setting stored in the storing from the information about the folder included in the print job list generated in the second generating, and generates a print job based on the acquired information about the print setting and the moved file.

7. The control method for the image formation apparatus according to claim 5, further comprising determining whether the file detected in the detecting is printable, wherein, in a case where the determining determines the file as unprintable, a secondly generating generates a print job list including error information representing an unprintable state and the firstly generating generates an error job based on the error information included in the generated print job list.

8. The control method for the image formation apparatus according to claim 7, wherein, in a case where the print processing is executed, the error job generated in the firstly generating is not subject to printing and the error information remains in history information of the print job.

9. A non-transitory computer readable storage medium storing a program, the program causing a computer to function as:

a storage unit configured to store a print setting corresponding to a folder referable by an external apparatus;

a detection unit configured to detect that a file is stored in the folder;

a movement unit configured to move the file detected by the detection unit to a storage area in the image formation apparatus;

a first generation unit configured to generate a print job based on the moved file and the print setting stored by the storage unit, the print setting being corresponding to the folder detected by the detection unit; and a processing unit configured to execute print processing based on the generated print job, wherein the storage area, to which the file is moved by the movement unit, in the image formation apparatus is an area inaccessible by an external apparatus.

* * * * *